US012734111B2

(12) United States Patent
Brakkee et al.

(10) Patent No.: US 12,734,111 B2
(45) Date of Patent: Sep. 15, 2026

(54) METHOD FOR STEP DISPENSING DISCRETE MEDICAMENTS FROM A DISPENSING SYSTEM, AND METHOD FOR CONTROLLING OPERATION OF A SYSTEM

(71) Applicant: VMI Holland B.V., Epe (NL)

(72) Inventors: Martinus Johannes Donatus Brakkee, Epe (NL); Peter van Roon, Epe (NL); Patrick van Voorn, Epe (NL)

(73) Assignee: VMI Holland B.V., Epe (NL)

( * ) Notice: Subject to any disclaimer, the term of this patent is extended or adjusted under 35 U.S.C. 154(b) by 401 days.

(21) Appl. No.: 18/291,965

(22) PCT Filed: Jul. 29, 2022

(86) PCT No.: PCT/EP2022/071447

§ 371 (c)(1),
(2) Date: Jan. 25, 2024

(87) PCT Pub. No.: WO2023/006998

PCT Pub. Date: Feb. 2, 2023

(65) Prior Publication Data

US 2024/0382382 A1 Nov. 21, 2024

(30) Foreign Application Priority Data

Jul. 30, 2021 (NL) ...................................... 2028895

(51) Int. Cl.
*A61J 7/00* (2006.01)
*A61J 7/04* (2006.01)
*G07F 9/00* (2006.01)

(52) U.S. Cl.
CPC ........... *A61J 7/0084* (2013.01); *A61J 7/0454* (2015.05); *G07F 9/006* (2013.01)

(58) Field of Classification Search
CPC ............................... A61J 7/0454; G07F 9/006
See application file for complete search history.

(56) References Cited

U.S. PATENT DOCUMENTS 7,289,879 B2 * 10/2007 William .................. B65B 5/103
700/235
7,848,846 B2 * 12/2010 Uema ................ G07F 17/0092
221/83

(Continued)

FOREIGN PATENT DOCUMENTS

WO 2014171818 A1 10/2014

*Primary Examiner* — Gene O Crawford
*Assistant Examiner* — Ayodeji T Ojofeitimi
(74) *Attorney, Agent, or Firm* — Ipsilon USA—NLO

(57) ABSTRACT

The invention relates to a method for step dispensing discrete medicaments from a dispensing system accommodating one or more feeder units and arranged for selectively dispensing an amount of discrete medicaments from the one or more feeder units, the system comprising: a dispensing device provided with an array of dispensing positions, wherein the dispensing device at each of the array of dispensing positions is provided with a holder for one of the feeder units and with a through opening for passing discharged medicaments there through, wherein the method comprises the steps of: sending a dispensing command with data indicating dispensing parameters to a dispensing position of the array of dispensing positions via a non-real-time connection; buffering the dispensing command at the dispensing position of the array of dispensing positions; and sending a dispensing trigger to the dispensing position of the array of dispensing positions via a real-time connection, therewith triggering a feeder unit to dispense discrete medicaments therefrom.

22 Claims, 6 Drawing Sheets

(56) References Cited

U.S. PATENT DOCUMENTS

| | | | | |
|---|---|---|---|---|
| 7,950,206 | B2 * | 5/2011 | Knoth | B65B 5/103<br>53/247 |
| 10,173,830 | B2 * | 1/2019 | 'T Lam | G01F 23/292 |
| 10,252,826 | B2 * | 4/2019 | Lokkers | B65B 35/30 |
| 10,589,883 | B2 * | 3/2020 | Van Wijngaarden | B65B 5/103 |
| 11,273,103 | B1 * | 3/2022 | Brakkee | A61J 7/0084 |
| 11,498,761 | B1 * | 11/2022 | Wijnia | B65G 1/137 |
| 2004/0195261 | A1 * | 10/2004 | Hashimoto | B65B 5/103<br>221/258 |
| 2006/0217842 | A1 | 9/2006 | Kobayashi et al. | |
| 2009/0301603 | A1 * | 12/2009 | Yuyama | B65B 5/103<br>141/234 |
| 2010/0211201 | A1 | 8/2010 | Papenfort et al. | |
| 2011/0315705 | A1 * | 12/2011 | Ando | A61J 7/0076<br>221/9 |
| 2012/0023277 | A1 | 1/2012 | Graf et al. | |
| 2014/0318086 | A1 * | 10/2014 | Ishizuka | B65B 35/26<br>53/244 |
| 2014/0366489 | A1 * | 12/2014 | Scholten | B65B 37/02<br>53/154 |
| 2015/0090733 | A1 * | 4/2015 | Park | A61J 7/0481<br>221/277 |
| 2015/0127145 | A1 * | 5/2015 | Kim | G16H 40/67<br>700/235 |
| 2015/0190312 | A1 * | 7/2015 | Yuyama | A61J 7/0084 |
| 2016/0068328 | A1 * | 3/2016 | 'T Lam | B65D 83/0409<br>53/244 |
| 2016/0182285 | A1 | 6/2016 | Ferguson et al. | |
| 2018/0082757 | A1 * | 3/2018 | Chambers | G07F 11/165 |
| 2019/0127091 | A1 * | 5/2019 | De Boer | B65B 9/045 |
| 2020/0121560 | A1 * | 4/2020 | Thomas | B65D 83/0454 |

* cited by examiner

METHOD FOR STEP DISPENSING DISCRETE MEDICAMENTS FROM A DISPENSING SYSTEM, AND METHOD FOR CONTROLLING OPERATION OF A SYSTEM

BACKGROUND

The invention relates to a method for step dispensing discrete medicaments from a dispensing system, and to a dispensing system for step dispensing discrete medicaments from feeder units. Furthermore, the invention relates to a method for controlling operation of a system, and to a system having one or more distinct modules. A method for step dispensing discrete medicaments from a dispensing system is known from WO 2014/171818, wherein the dispensing system accommodates a series of feeder units and is arranged for selectively dispensing an amount of the medicaments from one or more feeder units and for packing the dispensed amount, and wherein the system comprises: a dispensing device provided with an array of dispensing positions arranged adjacently in a plane, wherein the dispensing device at each of the array of dispensing positions is provided with a holder for one of the feeder units and with a through opening for passing discharged discrete medicaments there through; a collection frame arranged below the dispensing device, wherein the collection frame and the dispensing device are movable with respect to each other, wherein the collection frame is provided with a series of collection trays, each having an elongated shape with a longitudinal direction which extends substantially parallel to the plane and over a length of at least two of the through openings, wherein the trays comprise a receiving opening at a side facing the dispensing device for capturing the discharged discrete medicaments and each comprises an output; a packing unit arranged below the collection frame for collecting the captured discrete medicaments from the output of a tray and packing the solid medications; and a controller for controlling the working of the dispensing system and the feeder units arranged on the dispensing device. The controller is configured for controlling the dispensing system, such that it packs one or more discrete medicaments into a pouch at very high speed, wherein each pouch comprises a specific number and types of discrete medicaments and specific data associated with the patient for which the respective pouch is intended.

SUMMARY OF THE INVENTION

An important aspect of the known dispensing system relates to controlling the feeder units in order to dispense discrete medicaments therefrom, which may be understood as driving the feeder units so that one or more discrete medicaments are dispensed therefrom. For example, the known dispensing system may have over 1000 positions for holding feeder units and a large part of the more than 1000 positions, for example over 300 positions, may be used for dispensing discrete medicaments. At a rate of three or more pouches per second, the more than 300 positions need to be continuously controlled with data on the number of discrete medicaments to be dispensed, parameters to control the process of dispensing the discrete medicaments and a real-time trigger signal indicating that the dispensing action should start. A disadvantage of the described method is that receiving the real-time trigger signal too early can lead to dispensing errors, for example, in which one or more discrete medicaments may be packed in erroneous pouches.

Receiving the real-time trigger signal too late can lead to a delay in the dispensing process.

In order to overcome these disadvantages, known dispensing systems control the feeder units entirely via a real-time bus, such as Ethercat™ or Varan™. A disadvantage of using a real-time bus for controlling the feeder units is that such a real-time bus is rather expensive. Furthermore, each feeder unit receiving control data via the real-time bus requires that each dispensing position on that real-time bus must have its own address on the real-time bus, which disadvantageously renders each dispensing position rather expensive. A further disadvantage of using a real-time bus for controlling the feeder units is that the amount of data that may be sent over such real-time bus is relatively limited.

It is an object of the present invention to ameliorate or to eliminate one or more disadvantages of the prior art, to provide an improved dispensing method or system or to at least provide an alternative dispensing method or system.

According to a first aspect, the invention provides a method for step dispensing discrete medicaments from a dispensing system accommodating one or more feeder units and arranged for selectively dispensing an amount of discrete medicaments from the one or more feeder units, the system comprising:

- a dispensing device provided with an array of dispensing positions, wherein the dispensing device at each of the array of dispensing positions is provided with a holder for one of the feeder units and with a through opening for passing discharged medicaments there through, and
- a controller for controlling the working of the dispensing system and the feeder units arranged on the dispensing device, wherein the method comprises the steps of:

- sending a dispensing command with data indicating dispensing parameters to a dispensing position of the array of dispensing positions via a non-real-time connection;
- buffering the dispensing command at the dispensing position of the array of dispensing positions; and
- sending a dispensing trigger to the dispensing position of the array of dispensing positions via a real-time connection, therewith triggering a feeder unit to dispense discrete medicaments therefrom.

During use, the method allows the dispensing command, which for example states the number of discrete medicaments to dispense and parameters such as how to dispense the discrete medicaments, to be sent to one or more of the dispensing positions via a non-real-time bus, in particular before the one or more discrete medicaments have to be dispensed. The sent dispensing command is buffered at the respective dispensing position until the discrete medicaments have to be dispensed. When the one or more discrete medicaments actually have to be dispensed, the dispensing trigger is sent to the respective dispensing position of the array of dispensing positions via the real-time connection. The dispensing trigger is used for triggering the feeder unit placed at the respective dispensing position(s) to dispense the discrete medicament upon receiving the dispensing trigger. Since the dispensing command comprises data regarding the dispensing parameters, the dispensing command needs more bandwidth than the dispensing trigger. By sending the dispensing command to the respective dispensing position(s) via the non-real-time connection, before sending the dispensing trigger via the real-time connection, the dispensing command is provided to the dispensing positions in a much cheaper manner in comparison to a real-time connection. As only the dispensing trigger (which may be the same for all dispensing positions) is sent via the real-time connection, the real-time connection only needs to have sufficient bandwidth for sending the dispensing trigger. For example, the dispensing trigger only has to be a few bits wide, such that very little bandwidth is needed for triggering the feeder unit(s) at the dispensing position(s). This is advantageous as the real-time connection may be kept small, thereby keeping the costs associated with controlling dispensing by the feeder units low. This results in a cheaper method for step dispensing discrete medicaments in comparison to the prior art.

In the context of the present disclosure, non-real-time can be understood as a term used to indicate a process, event or action that is not guaranteed a response within a predefined timeframe. Most common general purpose computer systems like Windows™ are non-real-time. Real-time can be understood as a term to indicate a process, event or action of which input data is guaranteed to be processed within a specified time (deadline), usually a relative short time.

In an embodiment, the step of sending a dispensing command comprises sending a dispensing command in advance of the step of sending a dispensing trigger. In the context of the disclosure, sending a dispensing command in advance can be understood as that the dispensing command is sent at a time, such that the dispensing command has arrived before the dispensing trigger arrives. This is advantageous as this enables that dispensing of discrete medicaments may start immediately after receiving a dispensing trigger.

In an embodiment, the step of sending a dispensing command comprises sending multiple dispensing commands to the dispensing position of the array of dispensing positions. During operation, each of the dispensing commands is buffered at the respective dispensing position, such that a queue of dispensing commands is available at the respective dispensing position. It is thereby prevented that the step of dispensing is interrupted due to a missing dispensing command.

In an embodiment, the data of the dispensing command comprises information about the number of discrete medicaments to dispense, and/or parameters about how to dispense the number of discrete medicaments. Thus, the data may comprise all parameters needed for being able to dispense discrete medicaments, except for the trigger to start dispensing.

In an embodiment, the step of sending a dispensing command comprises the step of including a command cycle identifier into the dispensing command. In an embodiment thereof, for each time the step of sending a dispensing command is performed, the step of including a command cycle identifier comprises adjusting the command cycle identifier. In an even further embodiment, the step of sending a dispensing trigger comprises the step of sending a trigger cycle identifier along with the dispensing trigger. Preferably, for each time the step of sending a dispensing trigger is performed, the step of including a trigger cycle identifier comprises adjusting the trigger cycle identifier. Even more preferably the command cycle identifier and the trigger cycle identifier are substantially identical to each other. According to this embodiment, each dispensing command is provided with a unique command cycle identifier and each dispensing trigger is provided with a unique trigger cycle identifier, wherein the unique command cycle identifier and the unique trigger cycle identifier are substantially identical to each other. Therefore, the command cycle identifier and the trigger cycle identifier may be used for determining which dispensing command needs be executed when a dispensing trigger is received at a dispensing position. This helps to prevent a wrong dispensing command being executed upon receiving a dispensing trigger at a dispensing position.

Furthermore, when the command cycle identifier and the trigger cycle identifier are adjusted in an ascending or descending manner, they also may be used for indicating the position of the respective dispensing command in an order of multiple dispensing commands.

In an embodiment, the method comprises, at the dispensing position of the array of dispensing positions, checking whether a corresponding dispensing command is received at the dispensing position upon receipt of the dispensing trigger. Checking whether a dispensing command is received can comprise the steps of:

looking for a dispensing command, when a dispensing command is found, determining the command cycle identifier of the found dispensing command, comparing the trigger cycle identifier of the dispensing trigger with the determined command cycle identifier, and when the command cycle identifier and the trigger cycle identifier are substantially identical to each other, starting dispensing of discrete medicaments. In an embodiment thereof, the method comprises the steps of:

when multiple dispensing commands are found, determining the command cycle identifier of each of the found dispensing commands, comparing the trigger cycle identifier of the dispensing trigger with each of the determined command cycle identifiers, and when a substantially identical command cycle identifier is found, selecting the corresponding dispensing command and start dispensing of discrete medicaments based on the data of the corresponding dispensing command. When the dispensing trigger with a trigger cycle identifier is received at a dispensing position, it is determined whether a dispensing command with a corresponding command cycle identifier is present at the respective dispensing position. When it is determined that a dispensing command with a corresponding command cycle identifier is present at the respective dispensing position, dispensing of discrete medicaments from the respective dispensing position in line with the data of the dispensing command is started. When a corresponding dispensing command is lacking at the respective dispensing position, no discrete medicaments are dispensed at the respective dispensing position. It is thereby prevented that a dispensing trigger results in dispensing of incorrect discrete medicaments or of an incorrect amount of discrete medicaments.

Preferably, the method comprises the step of:

when a corresponding dispensing command is not found and, optionally, when a subsequent dispensing command is found, reporting an error situation to the controller. This is advantageous, for example, as an operator may be informed that the dispensing system is unable to execute a particular dispensing command due to the lacking particular dispensing command.

In an embodiment, reporting of an error situation is done via the non-real-time connection and/or via the real-time connection.

In an embodiment, the method comprises, upon report of an error situation, querying one or more dispensing positions of the array of dispensing positions in order to receive information about the error situation. In an embodiment thereof, querying the one or more dispensing positions of the array of dispensing positions is performed via the non-real-time connection. By querying information about the error situation via the non-real-time connection, large pieces of data, such as dispensing parameters and information about an error situation are transferred via the non-real-time connection. This is advantageous, as it allows the bandwidth of the real-time connection to be as small as possible, thereby keeping the costs for the real-time connection to a minimum.

In an embodiment, the method comprises, upon report of an error situation, pausing the dispensing system. In an embodiment thereof, the method comprises, upon pausing the dispensing system, sending a command to each dispensing position of the array of dispensing positions to remove one or more buffered dispensing commands, wherein the command is sent via the non-real-time connection. According to this embodiment, the dispensing commands which are not yet executed are resent to the dispensing positions or the clusters of dispensing positions. This can prevent that dispensing commands are skipped or are executed more than once, and the dispensing may be continued in a reliable manner.

In an embodiment, a dispensing position of the array of dispensing positions comprises one dispensing position or an array of dispensing positions. This allows the method according to this embodiment to control one dispensing position or multiple dispensing positions (segment control) with a single dispensing command.

According to a second aspect, the invention provides a dispensing system for step dispensing discrete medicaments from feeder units, wherein the dispensing system accommodates one or more feeder units and is arranged for selectively dispensing an amount of discrete medicaments from the one or more feeder units, the system comprising:

a dispensing device provided with an array of dispensing positions, wherein the dispensing device at each of the array of dispensing positions is provided with a holder for one of the feeder units and with a through opening for passing discharged medicaments there through, and a controlling unit for controlling the working of the dispensing system and the feeder units arranged on the dispensing device, wherein the controlling unit comprises a non-real-time controller operatively connected to each of the array of dispensing positions by a non-real-time connection, and a real-time controller operatively connected to each of the array of dispensing positions by a real-time connection, wherein the controller is configured for:

sending a dispensing command with data indicating dispensing parameters to a dispensing position of the array of dispensing positions via the non-real-time connection;

allowing the dispensing command to be buffered at the dispensing position of the array of dispensing positions; and sending a dispensing trigger to the dispensing position of the array of dispensing positions via the real-time connection, therewith triggering a feeder unit to dispense discrete medicaments therefrom.

In an embodiment, the non-real-time connection is selected from a group comprising an Ethernet connection and a non-real-time bus, and/or wherein the real-time connection is selected from a group comprising a real-time bus, Ethercat™, Varan™ and hardware I/O lines.

According to a third aspect, the invention provides a method for controlling operation of a system, wherein the system comprises one or more distinct modules, wherein the method comprises the steps of:

determining an execution plan comprising one or more tasks to be executed by the one or more distinct modules by means of a non-real-time controller;

at the non-real-time controller, for each of the determined tasks of the execution plan, sending a task parameter command to one of the distinct modules, which has to execute the task, wherein the task parameter command comprises parameters needed to execute the task, and sending an associated task trigger command to a real-time controller, wherein the task trigger command is configured to instruct the real-time controller to trigger the respective module to execute the task with which the task trigger command is associated;

upon receipt of the task trigger commands at the real-time controller, queueing the task trigger commands at the real-time controller; and at the real-time controller, executing the queued task trigger commands to trigger the respective modules to execute the task as indicated in the associated task parameter command.

In the prior art, a system with one or more distinct modules, such as a dispensing system for step dispensing discrete medicaments, is provided with a real-time controller, such as a Programmable Logic Controller (PLC) for controlling operation of the system. Such a PLC is very suitable for reading and controlling sensors and actuators in complex systems. For example, the PLC is enabled to precisely control specific motors, such as position motors, with the PLC having very accurate timing such that mechanical steps can be matched precisely. Complex systems, such as the dispensing system, further require a controller, in particular a non-real-time controller, that uses complex algorithms to determine which tasks have to be executed, for example, for dispensing the correct amount of discrete medicaments. For example, the dispensing system comprises various mechanical modules, which sometimes have to execute a particular task and sometimes have to idle. The non-real-time controller is used for controlling the PLC. When the dispensing system has a very high operating speed, e.g. a very high dispensing speed, controlling the PLC by the non-real-time controller quickly leads to delays, since the PLC has to wait for commands from the non-real-time controller.

In the method according to the third aspect of the invention, control of the real-time controller takes place asynchronously. Asynchronous control of the real-time controller allows the non-real-time controller to send task parameter commands to one or more distinct modules and task trigger commands to the real-time controller, without the need for waiting for a feedback, such as a confirmation, from the one or more distinct modules and/or from the real-time controller. Therefore, after sending a task parameter command or a task trigger command, the non-real-time controller, may quickly send a following task parameter command or task trigger command. As a result thereof, the real-time controller queues a number of task trigger commands to be executed and, therefore, is always provided with a next task trigger command to be executed. Therefore, the non-real-time controller has to be fast enough to send enough task parameter commands and task trigger commands on average, but not exactly on time each time. This can be understood to mean that a delay at the side of the non-real-time controller does not result in a delay at the side of the real-time controller.

This is advantageous, as the method enables the system to operate at a high speed, while the risk of a delay in operation is reduced or eliminated.

In an embodiment, the step of determining the execution plan comprises determining an order in which the tasks need to be executed, and including the tasks to be executed in the execution plan in the determined order. In an embodiment thereof, the real-time controller executes the queued task trigger commands in the order in which the task trigger commands are received and queued at the real-time controller. By providing the task trigger commands in the order in which they have to be executed to the real-time controller, the real-time controller may simply queue and execute the task trigger commands in the order in which they are received.

In an embodiment, the step of executing the queued task trigger commands comprises executing the queued task trigger commands one-by-one.

In an embodiment, each of the task parameter commands and the task trigger commands sent in relation to the tasks of the execution plan is provided with a synchronization identifier. In an embodiment thereof, the method comprises, at the real-time controller, the step of aligning the one or more tasks executed by and/or to be executed by the one or more distinct modules by use of the synchronization identifiers. In the context of the present disclosure, it has to be understood that during operation of the system the task of one distinct module sometimes has to wait until another task of another distinct module is completed. By providing the synchronization identifiers, it is made clear to the real-time controller which tasks have to be aligned with each other. Additionally, by aligning the one or more tasks by means of the synchronization identifiers, a task can be started as soon as a previous task is nearly or fully completed. Thus, the operating speed of the system is kept as high as possible.

In a further embodiment, the step of aligning the one or more tasks comprises, at the real-time controller, after triggering a module to execute a task by executing the associated task trigger command at the real-time controller, checking whether the following task depends on the task currently being executed. In an embodiment thereof, the method comprises, at the real-time controller, awaiting a confirmation from the module executing the current task in which it is confirmed that the task is completed before executing the following task, when it is determined that the following task depends on the task currently being executed. According to this embodiment, it advantageously is prevented that the following task is triggered and/or executed before the current task, on which the following task depends, is nearly or fully completed.

In an embodiment, the method comprises, at each of the one or more distinct modules, sending a response message from the module to the non-real-time controller indicating that the task is completed by the module, when a task is completed by the module. In an embodiment thereof, the method comprises reporting an error state of the module from the module to the non-real-time controller, when executing a task at the particular module fails and/or cannot be completed, wherein an error handling mode is triggered by the non-real-time controller upon report of the error state. By reporting an error state and triggering an error handling mode when it is determined that a module is not capable of completing the task sent to it, it is prevented that the system keeps operating and outputs an erroneous product, such as a pouch with incorrect discrete medicaments. According to this embodiment, the error will be solved before the system continues with normal operation.

In a further embodiment thereof, the error handling mode comprises the steps of:

- at the non-real-time controller, awaiting for all response messages from the one or more distinct modules of previously executed tasks;
- clearing all task parameter commands and task trigger commands sent from the non-real-time controller;
- determining whether an error indicated by the error state can be corrected automatically;
- when it is determined that the error may be corrected automatically, re-determining the execution plan and sending task parameter commands and task trigger commands regarding the tasks of the re-determined execution plan;
- when it is determined that the error may not be corrected automatically, reporting the error to an operator and allowing the operator to input a correction to the error;
- after allowing the operator to input a correction to the error, determining whether the execution plan can be completed without further errors;
- when it is determined that the execution plan cannot be completed without further errors, stopping execution of the execution plan,
- when it is determined that the execution plan can be completed without further errors, re-determining the execution plan and sending task parameter commands and task trigger commands regarding the tasks of the re-determined execution plan. According to this embodiment, interference of an operator to the operation of system is kept to a minimum, as the method allows the error to be corrected automatically, while keeping the operating speed of the system as high as possible.

According to a fourth aspect, the invention provides a system having one or more distinct modules, a non-real-time controller and a real-time controller,

- wherein the non-real-time controller is operatively connected to each of the one or more distinct modules and the real-time controller, and
- wherein the real-time controller is operatively connected to each of the one or more distinct modules and to the non-real-time controller,
- wherein the non-real-time controller is configured for:
  - determining an execution plan comprising one or more tasks to be executed by the one or more distinct modules;
  - for each of the determined tasks of the execution plan, sending a task parameter command to one of the distinct modules, which has to execute the task, wherein the task parameter command comprises parameters needed to execute the task, and sending an associated task trigger command to the real-time controller, wherein the task trigger command is configured to instruct the real-time controller to trigger the respective module to execute the task with which the task trigger command is associated;
- wherein the real-time controller is configured for:
  - upon receipt of the task trigger commands at the real-time controller, queueing the task trigger commands; and
  - executing the queued task trigger commands to trigger the respective modules to execute the task as indicated in the associated task parameter command.

The system according to the fourth aspect of the invention has at least the same technical advantages as described in relation to the method according to the third aspect of the invention.

In an embodiment, the real-time controller is selected from a group comprising a Programmable Logic Controller (PLC) and a Remote Telemetry Unit (RTU).

In an embodiment, the non-real-time controller is operatively connected to each of the one or more distinct modules and the real-time controller via a non-real-time connection, such as an Ethernet connection, and wherein the real-time controller is operatively connected to each of the one or more distinct modules via a real-time connection, such as EtherCAt and/or hardware I/O lines.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
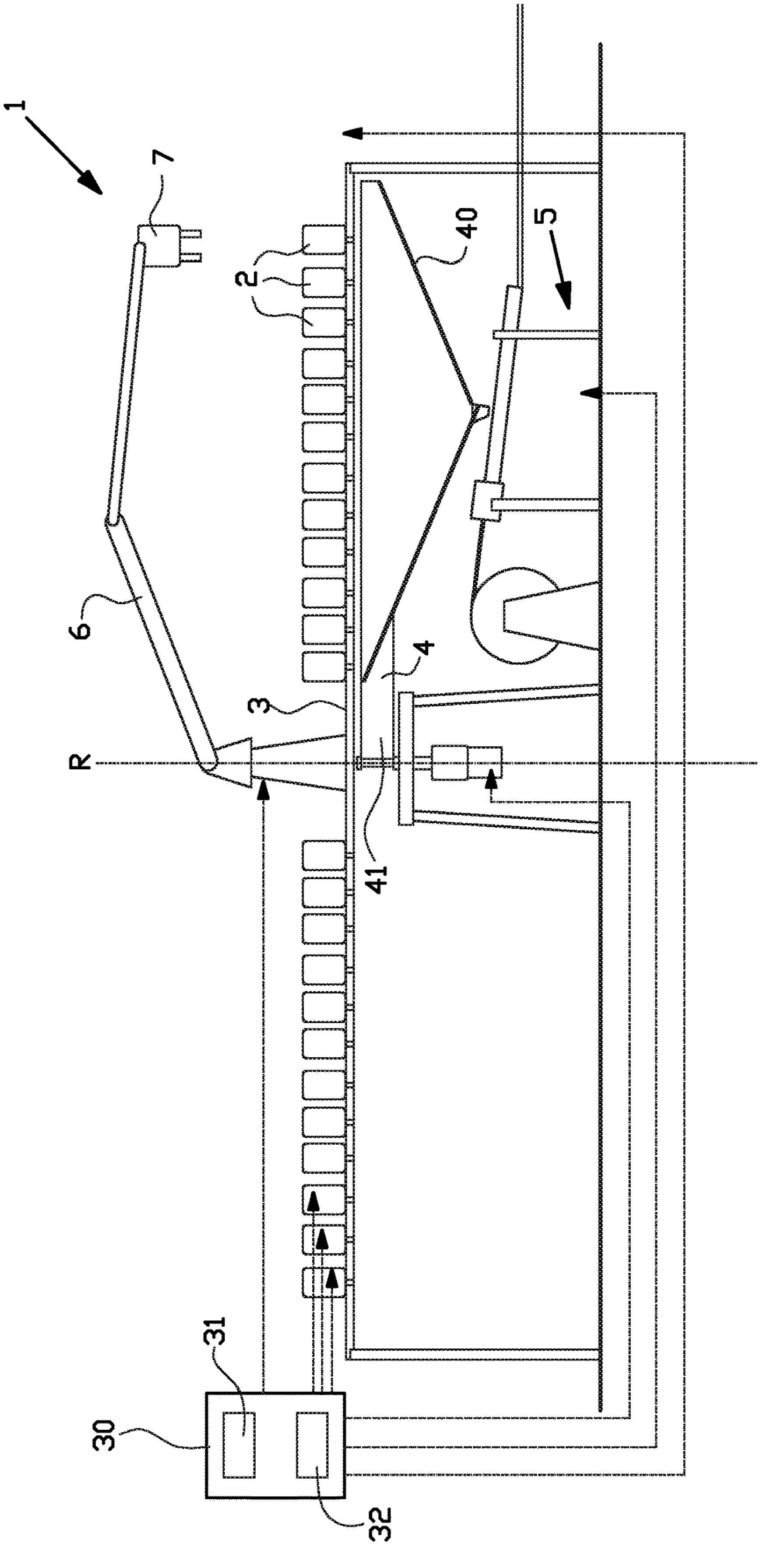
FIG. 1 shows a schematic cross section of a dispensing system having a dispensing device provided with an array of dispensing positions for accommodating a number of feeder units for selectively dispensing an amount of medicaments from one or more feeder units and for packing the dispensed amount.
Figure 2:
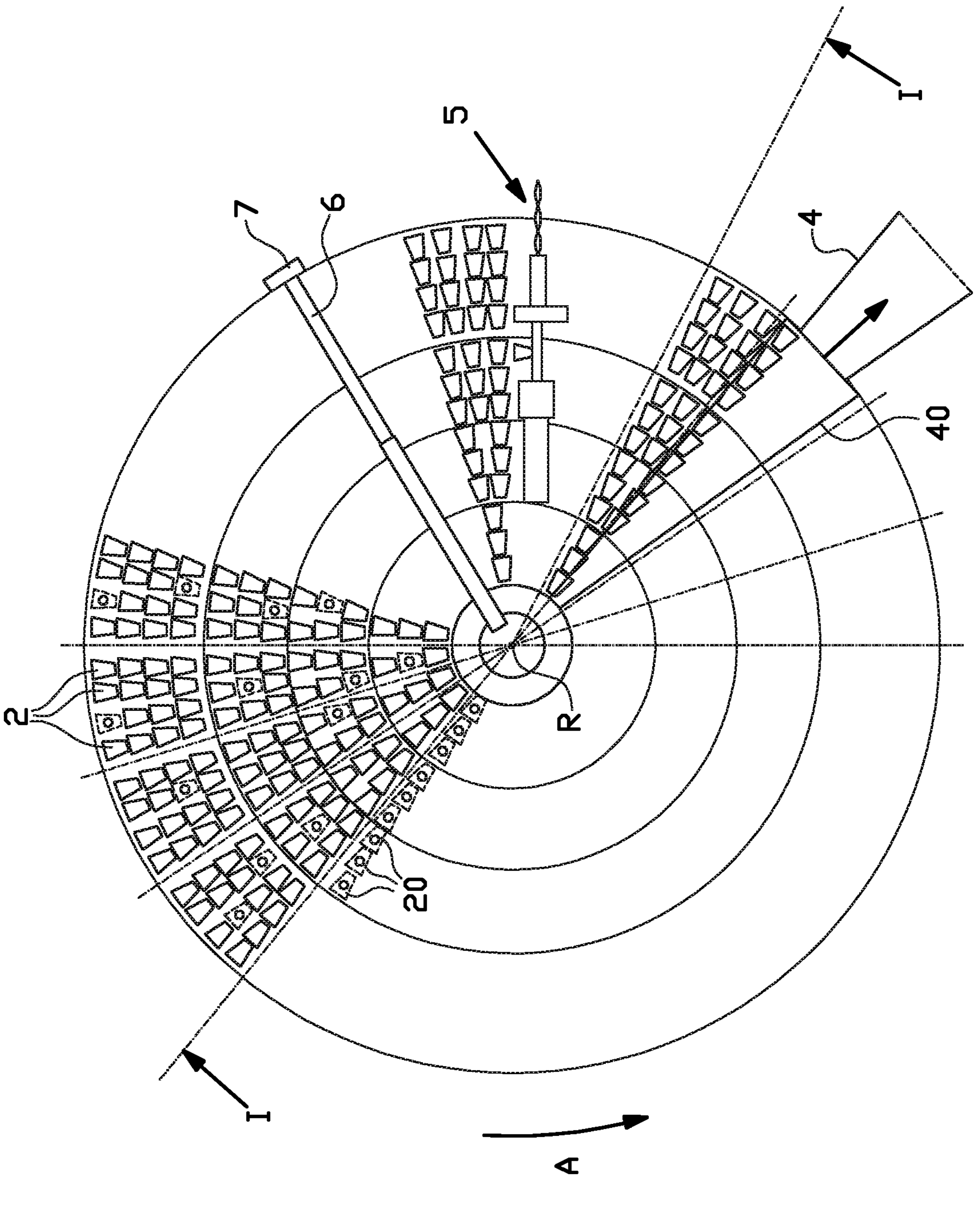
FIG. 2 shows a schematic top view of the dispensing system of the embodiment of FIG. 1.

A schematic cross-section of a dispensing system 1 that accommodates a number of feeder units 2 for selectively dispensing an amount of medicaments, pharmaceuticals or solid items, articles or substances for medical use, e.g. pills, tablets, capsules or the like, from one or more feeder units 2 and for packing the dispensed amount of medicaments, is shown in FIGS. 1 and 2. The medicaments are 'discrete' in the sense that they can be dispensed one-by-one, individually, separately or in dose units.

The dispensing system 1 comprises a dispensing device 3 configured for dispensing the medicaments. A collection device 4 is arranged below the dispensing device 3, which collection device 4 is configured for collecting the dispensed medicaments from the dispensing device 3. A packing unit 5 is arranged below the collection device 4, which packing unit 5 is configured for packing the collected medicaments. Optionally, the dispensing system 1 is provided with a (not shown) housing for shielding the dispensing device 3, the collection device 4 and the packing unit 5 from unauthorized access.

The dispensing device 3 is provided with an array of dispensing positions 20 with a (not shown) holder for holding a plurality of feeder units 2, also known as canisters or tablet cases. The dispensing positions 20 are distributed circumferentially about a rotation axis R. In particular, as best shown in FIG. 2, the dispensing positions 20 are distributed according to a radial grid having a number of rows with feeder units 20 arranged radially about a rotation axis R.

As further shown in FIG. 1, the dispensing system 1 further comprises a robotic manipulator 6, such as a robot arm, configured for handling the feeder units 2 with respect to the dispensing positions. The robotic manipulator 6 is arranged on the dispensing device 3 at or near the rotation axis R thereof. The robotic manipulator 6 is configured for handling the feeder units 2 in an automatic manner, wherein handling comprises, but is not limited to positioning, removing and repositioning the feeder units 2 within the dispensing system 1. The robotic manipulator 6 is provided with a gripper 7 at the distal end thereof, which gripper 7 is configured for gripping one of the feeder units 2 in order to place the one of the feeder units 2 into the dispensing device 3, or to remove the one of the feeder units 2 from the dispensing device 3.

As shown in FIG. 1, the collection device 4 has a number of collection trays 40, also called collection hoppers. Each collection tray 40 extends radially below one or more feeder units 2 and is open at the side facing towards the dispensing device 2 in order to receive medicaments selectively dispensed from one or more feeder units 2. The collection trays 40 taper towards the packing unit 5, and are closed at the bottom by a valve such that collected medicaments may be released from the tray 40 to the packing unit 5 selectively.

The collection trays 40 are arranged in a collection frame 41 and are distributed circumferentially around the rotation axis R. The collection frame 41 is rotatable in a collection direction A about the rotation axis R in order to rotate the collection trays 40 with respect to the plurality of dispensing positions 20. For example, the rotation may be a stepped rotation such that each step of a tray aligns the collection tray 40 with a subsequent series of feeder units 2 arranged within the dispensing device 3.

The non-shown valve of a respective one of the plurality of trays 40 is opened when the respective one of the plurality of trays 40 is located above the packing unit in order to release collected medicaments from the respective one of the plurality of trays 40 into the packing unit 5. The packing unit 5 comprises a stock member for holding the packaging material, in this example a foil, a printer for printing information about the medicaments on the foil, a filling member for positioning the foil to receive the medicaments, a seal member for forming a pouch around the received medicaments, a perforation member for providing the foil with perforations between subsequently formed pouches and an output member for outputting the packaged medicaments from the dispensing system 1.

The dispensing system 1 further comprises a controlling unit 30 for controlling operation of the dispensing system 1. In particular, the controlling unit 30 is provided with a non-real-time controller 31 that is operatively connected to the feeder units 2, the dispensing device 3, the collection device 4, the packing unit 5, the robotic manipulator 6, and other electronic equipment, such as drives, sensors and the like, via a non-real-time connection, such as a non-real-time bus, for example an Ethernet connection, and with a real-time controller 32 that is also operatively connected to the feeder units 2, the dispensing device 3, the collection device 4, the packing unit 5, the robotic manipulator 6, and other electronic equipment, such as drives, sensors and the like, via a real-time connection, such as a real-time bus, for example a hardware I/O line. Each of the non-real-time controller 31 and the real-time controller 32 may comprise a processor and a non-transitory computer-readable medium having computer instructions saved thereon that, when executed by the processor, cause the dispensing system 1 to perform the methods described in more detail below. Alternatively, the controlling unit 30 comprises a processor and a non-transitory computer-readable medium having computer instructions saved thereon that, when executed by the processor, cause the dispensing system 1 to perform the methods described in more detail below, wherein the non-real-time controller 31 and the real-time controller 32 are software-based and/or part of a software program. This may be understood as that the non-real-time controller 31 and the real-time controller 32 define a non-real-time environment and a real-time environment, respectively.

In the context of the present disclosure, it is noted that each of the feeder units 2 may be provided with its own active modules, such as a driving motor, among others for driving dispensing of the respective feeder unit 2, in which case the respective feeder unit 2 is operatively connected to the controlling unit 30 via interface connections of the feeder unit 2 and of the dispensing position at which the feeder unit 2 is located. In this case, the feeder units 2 are directly operatively connected to the controlling unit 30, in particular the non-real-time controller and the real-time controller. Alternatively, each of the feeder units 2 may not have its own active modules, in which case the active modules, such as an external driving motor, are provided at each of the dispensing positions for driving dispensing by the feeder units 2. In this case, the external driving motor of each dispensing position is operatively connected to the controlling unit 30, in particular the non-real-time controller and the real-time controller, and the feeder units 2 are indirectly operatively connected to the controlling unit 30, in particular the non-real-time controller and the real-time controller. Herein below, when it is described that data, a message, a trigger or the like is sent to a dispensing system, this can be understood as the data, message, trigger or the like is being sent to the active modules at a respective dispensing position or to the active modules within a respective feeder unit 2.

Figure 3:
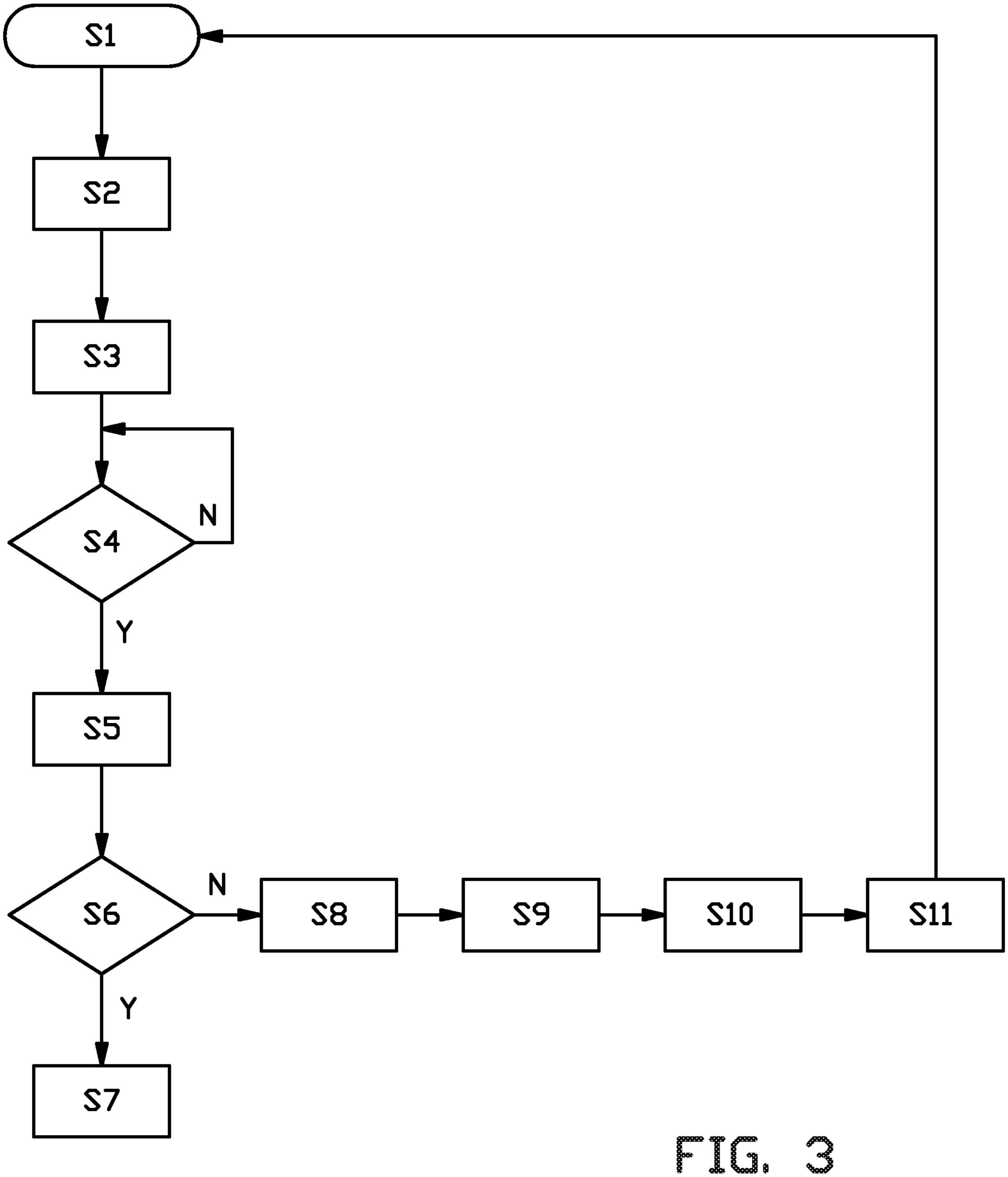
FIG. 3 shows a diagram of the steps of a method for step dispensing discrete medicaments from the dispensing system of FIG. 1.

FIG. 3 shows a diagram of the steps of step dispensing discrete medicaments by means of the dispensing system 1. As a first step, S1, a dispensing order is received at the controlling unit 30, which dispensing order may be received from an external party or may be determined by the controlling unit 30 itself. On a basis of the dispensing order, in step S2, a dispensing command is sent to a dispensing position 20, or to a cluster of dispensing positions 20, for segment control from the non-real-time controller via the non-real-time connection. The dispensing command comprises data that indicates dispensing parameters for the dispensing event to be performed at the respective dispensing position 20 or at the respective cluster of dispensing positions 20. The dispensing parameters, for example, indicate the number of discrete medicaments to be dispensed, and the driving parameters indicating how to drive a feeder unit 2 at the dispensing position(s) 20. Furthermore, the dispensing command is provided with a command cycle identifier for identifying the dispensing command and, optionally, for indicating the position of the respective dispensing command within a set of dispensing commands. In the context of the invention, the dispensing command does not provide a trigger to start dispensing the discrete medicaments.

Upon receipt of the dispensing command at the respective dispensing position 20 or the respective cluster of dispensing positions 20, the dispensing command is buffered at the respective dispensing position 20 or the respective cluster of dispensing positions 20, step S3. By buffering the dispensing command at the respective dispensing position 20 or the respective cluster of dispensing positions 20, the dispensing command may be sent in advance to the respective dispensing position 20 or the respective cluster of dispensing positions 20, such that the dispensing command is available at the respective dispensing position 20 or the respective cluster of dispensing positions 20 when required. It does not matter how much in advance the dispensing command is sent. It is noted that a number of dispensing commands may be buffered at the respective dispensing position 20 or the respective cluster of dispensing positions 20, since each dispensing command includes a command cycle identifier, in particular a unique command cycle identifier.

Subsequently, it is determined whether the dispensing command needs to be executed, in step S4. Determining whether the dispensing commands or one of the dispensing commands needs to be executed may be understood as receiving an indication that particular discrete medicaments need to be dispensed, for example because a specific collection tray 40 is located at or near the dispensing position 20 at which the dispensing command is buffered.

When it is determined that the dispensing command or one of the dispensing commands needs to be executed, in step S5, a dispensing trigger is sent from the real-time controller to the respective dispensing position 20 or the respective cluster of dispensing positions 20, wherein the dispensing trigger is sent via the real-time connection. The dispensing trigger is configured for triggering the feeder unit(s) at the respective dispensing position 20 or at the cluster of respective dispensing positions 20 to start dispensing discrete medicaments therefrom. The dispensing trigger is provided with a trigger cycle identifier, which trigger cycle identifier is used for identifying an associated dispensing command on a basis of the command cycle identifier thereof, wherein each of the trigger cycle identifier and the command cycle identifier indicates the cycle of the particular dispensing trigger and dispensing command, respectively, to indicate an order in which the dispensing commands have to be processed.

Upon receipt of the dispensing trigger at the respective dispensing position 20 or at the respective cluster of dispensing positions 20, in step S6, the dispensing trigger activates looking for whether a corresponding dispensing command is buffered at the respective dispensing position 20 or at the respective cluster of dispensing positions 20. This is done by looking for a dispensing command of which the command cycle identifier is substantially identical to the trigger cycle identifier, thereby indicating the dispensing command that needs to be executed.

When it is determined that a corresponding dispensing command is buffered at the respective dispensing position 20 or at the respective cluster of dispensing positions 20, in step S7, the feeder unit 2 or the feeder units 2 at the respective dispensing position 20 or at the respective cluster of dispensing positions 20 start dispensing the discrete medicaments as indicated in the corresponding dispensing command.

When it is determined that a corresponding dispensing command is not buffered at the respective dispensing position 20 or at the respective cluster of dispensing positions 20 and, optionally, when it is determined that a subsequent dispensing command is already available, in step S8, the respective dispensing position 20 or the respective cluster of dispensing positions 20 return(s) an error signal, in particular to the non-real-time controller, indicating that the particular dispensing command is missing. Subsequently, the non-real-time controller queries the respective dispensing position 20 or the respective cluster of dispensing positions 20, step S9, in order to find out which error has occurred. Thereafter, or simultaneously, the dispensing system 1 is stopped or paused, step S10.

When the dispensing system is stopped or paused, the non-real-time controller instructs the dispensing positions 20 to remove the already received and buffered dispensing commands, step S11, whereafter new dispensing commands may be sent to the dispensing positions 20.

Figure 4:
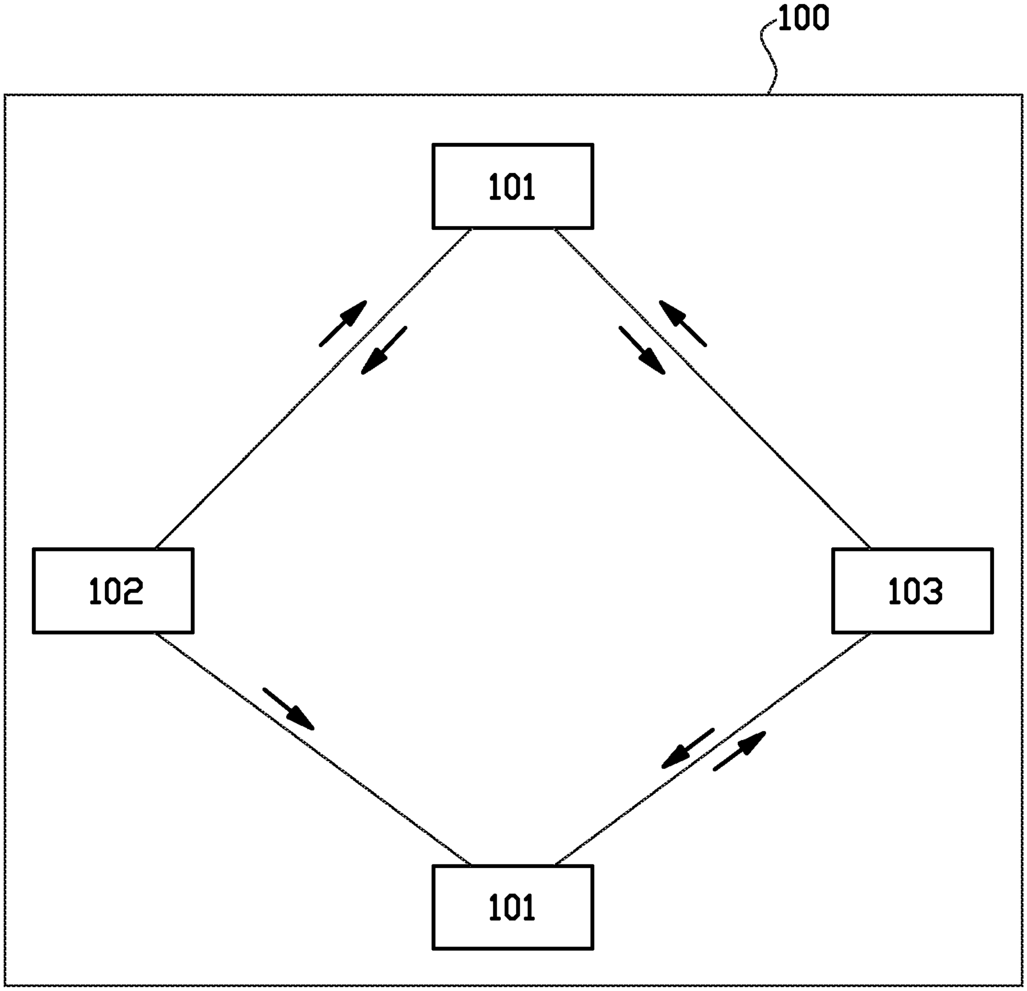
FIG. 4 shows a schematic overview of a system with modules according to an embodiment of the invention.

FIG. 4 shows a schematic overview of a system 100 having a number of distinct modules 101. In the context of the present disclosure, the distinct modules 101 can be understood as modules 101 that are controlled independently from each other or are dependent on each other, such that one of the modules 101 may perform a task when another module 101 has completed its task. In case the system 100, for example, is a dispensing system 1 as described above, the distinct modules 101 may comprise, but are not limited to, for example, the packing unit 5, or an electric module thereof, such as a printer, the robotic manipulator 3, the feeder units 2, etc.

The system 100 further is provided with a non-real-time controller 102 and a real-time controller 103, such as a Programmable Logic Controller (PLC). The non-real-time controller 102 is operatively connected to each of the modules 101 of the system 100 and to the real-time controller 103, wherein the real-time controller 103 is also operatively connected to each of the modules 101 and to the non-real-time controller 102. As indicated in FIG. 4, bi-directional communication is possible between the non-real-time controller 102 and each of the modules 101, between the real-time controller 103 and each of the modules 101, and between the non-real-time controller 102 and the real-time controller 103. Each of the non-real-time controller 102 and the real-time controller 103 may comprise a processor and a non-transitory computer-readable medium having computer instructions saved thereon that, when executed by the processor, cause dispensing system 100 to perform the methods described in more detail below.

Figure 5:
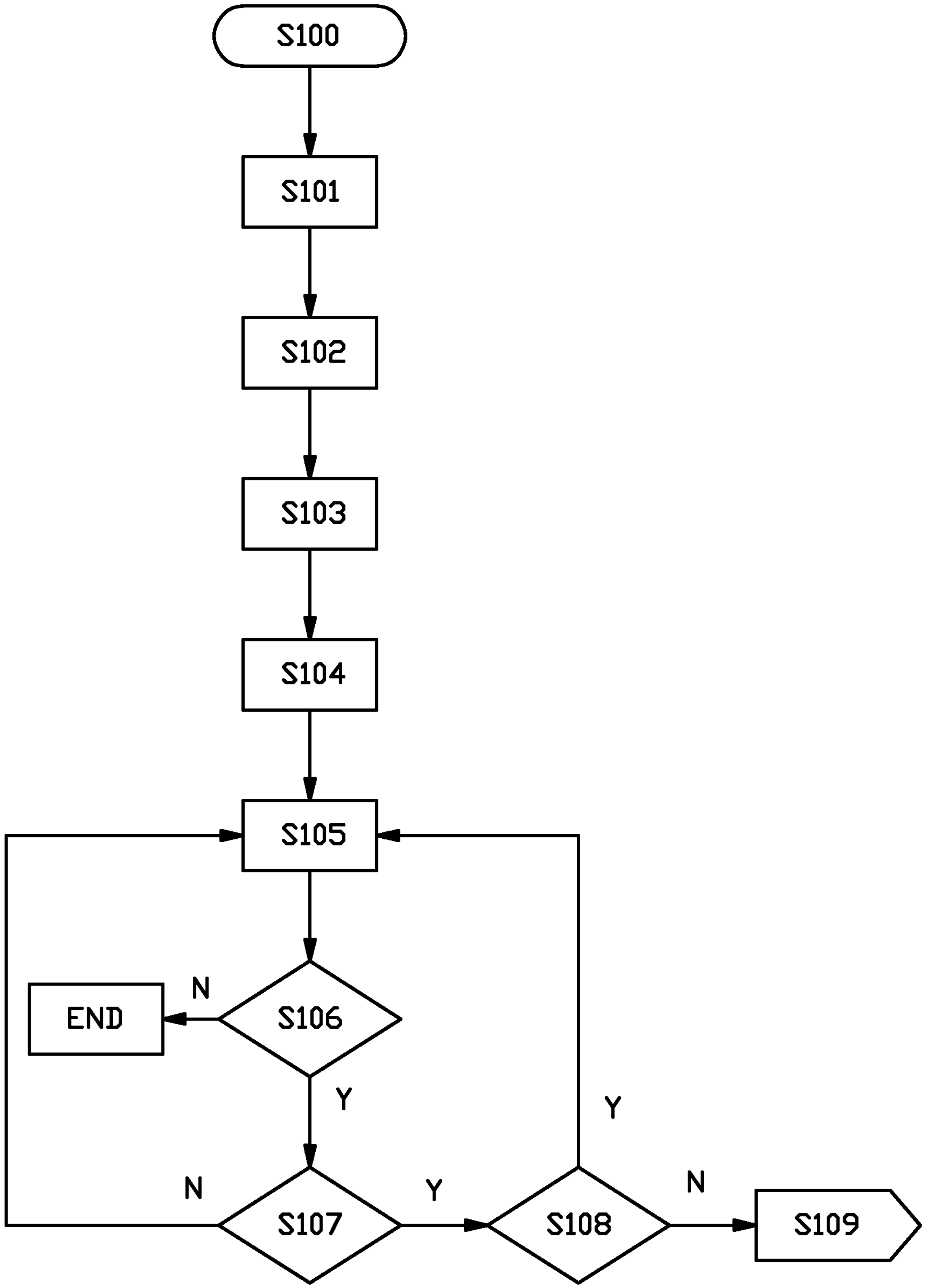
FIG. 5 shows a diagram of the steps of a method for controlling operation of the system of FIG. 4, with an error handling mode.

FIG. 5 shows a diagram of the steps of controlling operation the system 100, wherein the system 100 may be a dispensing system 1 as described above. As a first step, step S100, the system 100 receives one or more orders that need to be fulfilled by the system 100.

Upon receiving one or more orders that need to be fulfilled, the non-real-time controller 102, in step S101, determines an execution plan defining tasks that need to be executed by the modules 101 of the system 100 in order to be able to fulfill the received one or more orders. Optionally, the non-real-time controller 102 also determines the order in which the tasks need to be executed and includes the tasks in the right order in the execution plan. When the execution plan has been determined, in step S102, the non-real-time controller 102, for each task in the execution plan while sticking to the order of the tasks in the execution plan, sends a task parameter command to the module 101 that needs to execute the respective task. The task parameter command comprises parameters needed to execute the respective task, but does not trigger the respective module 101 to execute the task. Additionally, the task parameter command includes a synchronization identifier for aligning the tasks of the different modules 101 of the system 100.

After sending the task parameter command for a respective task, the non-real-time controller 102 sends a task trigger command to the real-time controller 103, step S103. The task trigger command indicates that the real-time controller 103 may trigger the respective module 101 to execute the task with which the task trigger command is associated, and which module 101 to trigger. The task trigger command is also provided with the same synchronization identifier as the corresponding task parameter command in order to align the tasks of the different modules 101 of the system 100.

The non-real-time controller 102 is continuously sending task parameter commands and task trigger commands, while sticking to the order of the tasks in the execution plan, as a result of which multiple task trigger commands are received at the real-time controller 103. Upon receiving the task trigger command(s) at the real-time controller 103, the task trigger command(s) is (are) queued, also called buffered, at the real-time controller, step S104.

The real-time controller 103 executes the task trigger commands in the order in which they are received at the real-time controller 103. When the real-time controller 103 executes one of the task trigger commands, the real-time controller 103 sends a trigger to the module 101 indicated in the task trigger command in order to trigger the respective module 101 to execute the task as indicated in the corresponding received task parameter command, step S105. When the task trigger command has been sent to the respective module 101, it is determined whether there are further task trigger commands queued at the real-time controller 103, step 106. If no further task trigger commands are queued at the real-time controller 103, the method is ended.

When it is determined that at least one further task trigger command is queued at the real-time controller 103, in step 107, it is determined whether the following task associated with the following task trigger command in the queued task trigger commands depends on the current task as indicated by the current task trigger command. If depending, the following task may only be triggered when the current task is completed. This is determined by means of the synchronization identifiers included in the task parameter commands and the task trigger commands. When it is determined that the following task is independent from the current task, the following task is executed as indicated in FIG. 5.

If it is determined that the following task depends on the current task, such that the current task has to be nearly or fully completed before the following task may be executed, the real-time controller 103 checks during a predetermined time period whether or not the module 101 that had to execute the task sends feedback that the task associated with the current task trigger command, which is the task trigger command that has been executed last, has been executed, step 108. If the real-time controller 103 receives feedback that the task has been nearly or fully completed, the real-time controller 103 continues with executing the following task trigger command.

Additionally, and optionally simultaneously, in step S108, when a task has been executed by the particular module 101, the particular module 101 sends a response message indicating completion of the executed task to the non-real-time controller 102. When executing a task at the particular module 101 fails and/or cannot be completed, the task ends in an error state and this error state is reported to the non-real-time controller 102 directly.

Figure 6:
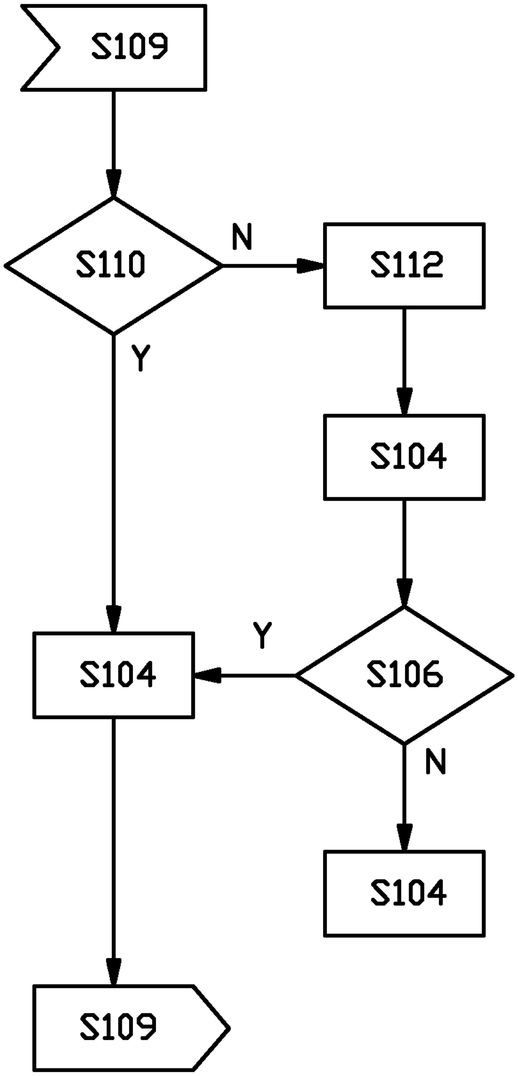
FIG. 6 shows a diagram of the steps of the error handling mode of FIG. 5.

When the error state is reported to the non-real-time controller 102, the method switches to an error handling mode, step S109, which is schematically shown in FIG. 6. The error handling mode comprises the steps, step S110, of awaiting for all response messages of previously executed tasks at the non-real-time controller and, when all response messages of previously executed tasks are received, determining by the non-real-time controller 102 whether the error may be corrected automatically, without interference of an operator. If the error may be corrected automatically, the execution plan is re-determined, step S111, e.g. determining an execution plan on a basis of the remaining tasks and taking the error state into account, whereafter the error handling mode returns to step S102 of the method.

If it is determined that the error may not be corrected automatically, the error is reported to an operator of the system 100, step 112, such that the operator may perform manual actions, step S113, in order to correct the error. After the manual actions of the operator, it is determined whether the one or more orders may be completed without errors, step S114. If not, the error handling mode interrupts processing of the one or more orders, step S115. If the one or more orders may be completed without errors, the error handling mode continues to step S111, whereafter the method is continued at step S102 with a re-determined execution plan.

It is to be understood that the above description is included to illustrate the operation of embodiments and is not meant to limit the scope of the invention. From the above discussion, many variations will be apparent to one skilled in the art that would yet be encompassed by the scope of the present invention.

LIST OF REFERENCE NUMERALS

1 dispensing system
2 feeder unit
3 dispensing device
4 collection device
5 packing unit
6 robotic manipulator
7 gripper
20 dispensing positions
21 positioning column
22 drop tube
30 controller
31 non-real-time controller
32 real-time controller
40 collection trays
41 collection frame
S1-S11 steps of dispensing method
100 system
101 modules
102 non-real-time controller
103 real-time controller
S100-S115 steps of controlling method

The invention claimed is:

1. Method for step dispensing discrete medicaments from a dispensing system accommodating one or more feeder units and arranged for selectively dispensing an amount of discrete medicaments from the one or more feeder units, the system comprising:

a dispensing device provided with an array of dispensing positions, wherein the dispensing device at each of the array of dispensing positions is provided with a holder for one of the feeder units and with a through opening for passing discharged medicaments there through, wherein the method comprises the steps of:

sending a dispensing command with data indicating dispensing parameters to a dispensing position of the array of dispensing positions via a non-real-time connection, wherein the dispensing command includes a command cycle identifier;

buffering the dispensing command at the dispensing position of the array of dispensing positions; and sending a dispensing trigger including a trigger cycle identifier to the dispensing position of the array of dispensing positions via a real-time connection, therewith triggering a feeder unit to dispense discrete medicaments therefrom, wherein the command cycle identifier and the trigger cycle identifier are substantially identical to each other; and at the dispensing position of the array of dispensing positions, checking whether a corresponding dispensing command is received at the dispensing position upon receipt of the dispensing trigger by:

looking for a dispensing command, when a dispensing command is found determining the command cycle identifier of the found dispensing command, comparing the trigger cycle identifier of the dispensing trigger with the determined command c e identifier, and when the command cycle identifier and the trigger cycle identifier are substantially identical to each other, starting dispensing of discrete medicaments.

2. Method according to claim 1, wherein the step of sending a dispensing command comprises sending a dispensing command in advance of the step of sending a dispensing trigger.

3. Method according to claim 1, wherein the wherein the step of sending a dispensing command comprises sending multiple dispensing commands to the dispensing position of the array of dispensing positions.

4. Method according to claim 1, wherein the data of the dispensing command comprises information about the number of discrete medicaments to dispense, and/or parameters about how to dispense the number of discrete medicaments.

5. Method according to claim 1, wherein, for each time the step of sending a dispensing command is performed, the step of including a command cycle identifier comprises adjusting the command cycle identifier.

6. Method according to claim 1, wherein, for each time the step of sending a dispensing trigger is performed, the step of including a trigger cycle identifier comprises adjusting the trigger cycle identifier.

7. Method according to claim 1, comprising the steps of:

when multiple dispensing commands are found, determining the command cycle identifier of each of the found dispensing commands, comparing the trigger cycle identifier of the dispensing trigger with each of the determined command cycle identifiers, and when a substantially identical command cycle identifier is found, selecting the corresponding dispensing command and starting dispensing of discrete medicaments based on the data of the corresponding dispensing command.

8. Method according to claim 1, comprising the step of:

when a corresponding dispensing command is not found and, optionally, when a subsequent dispensing command is found, reporting an error situation to the controller.

9. Method according to claim 8, comprising, upon report of an error situation, querying one or more dispensing positions of the array of dispensing positions in order to receive information about the error situation.

10. Method according to claim 8, comprising, upon report of an error situation, pausing the dispensing system.

11. Method according to claim 10, comprising, upon pausing the dispensing system, sending a command to each dispensing position of the array of dispensing positions to remove one or more buffered dispensing commands, wherein the command is sent via the non-real-time connection.

12. Method for controlling operation of a medicament dispensing system, wherein the system comprises one or more distinct modules, wherein the method comprises the steps of:

determining an execution plan comprising one or more tasks to be executed by the one or more distinct modules by means of a non-real-time controller;

at the non-real-time controller, for each of the determined tasks of the execution plan, sending a task parameter command to one of the distinct modules, which has to execute the task, wherein the task parameter command comprises parameters needed to execute the task, and sending an associated task trigger command to a real-time controller, wherein the task trigger command is configured to instruct the real-time controller to trigger the respective module to execute the task with which the task trigger command is associated;

upon receipt of the task trigger commands at the real-time controller, queueing the task trigger commands at the real-time controller; and at the real-time controller, executing the queued task trigger commands to trigger the respective modules to execute the task as indicated in the associated task parameter command; wherein each of the task parameter commands and the trig r commands sent in relation to the tasks of the execution plan is provided with a synchronization identifier; and at the real-time controller, the step of aligning the one or more tasks executed by and/or to e executed the one or more distinct modules by use of the synchronization identifiers; and wherein the step of aligning the one or more tasks comprises, at the real-time controller, after triggering a module to execute a task by executing the associated ask trigger command at the real-time controller, checking whether the following task depends on the task currently being executed by means of the synchronization identifiers included in the task parameter commands and the task er commands.

13. Method according to claim 12, wherein the step of determining the execution plan comprises determining an order in which the tasks need to be executed and including the tasks to be executed in the execution plan in the determined order.

14. Method according to claim 13, wherein the real-time controller executes the queued task trigger commands in the order in which the task trigger commands are received and queued at the real-time controller.

15. Method according to claim 12, wherein the step of executing the queued task trigger commands comprises executing the queued task trigger commands one-by-one.

16. Method according to claim 12, comprising, at the real-time controller, awaiting a confirmation from the module executing the current task in which it is confirmed that the task is completed before executing the following task, when it is determined that the following task depends on the task currently being executed.

17. Method according to claim 16, comprising, at each of the one or more distinct modules, sending a response message from the module to the non-real-time controller indicating that the task is completed by the module, when a task is completed by the module.

18. Method according to claim 17, comprising reporting an error state of the module from the module to the non-real-time controller, when executing a task at the particular module fails and/or cannot be completed wherein an error handling mode is triggered by the non-real-time controller upon report of the error state.

19. Method according to claim 18, wherein the error handling mode comprises the steps of:

at the non-real-time controller, awaiting for all response messages from the one or more distinct modules of previously executed tasks;

clearing all task parameter commands and task trigger commands sent from the non-real-time controller;

determining whether an error indicated by the error state can be corrected automatically;

when it is determined that the error may be corrected automatically, re-determining the execution plan and sending task parameter commands and task trigger commands regarding the tasks of the re-determined execution plan;

when it is determined that the error may not be corrected automatically, reporting the error to an operator and allowing the operator to input a correction to the error;

after allowing the operator to input a correction to the error, determining whether the execution plan can be completed without further errors;

when it is determined that the execution plan cannot be completed without further errors, stopping execution of the execution plan, when it is determined that the execution plan can be completed without further errors, re-determining the execution plan and sending task parameter commands and task trigger commands regarding the tasks of the re-determined execution plan.

20. Medicament dispensing system having one or more distinct modules, a non-real-time controller and a real-time controller, wherein the non-real-time controller is operatively connected to each of the one or more distinct modules and the real-time controller, and wherein the real-time controller is operatively connected to each of the one or more distinct modules and to the non-real-time controller, wherein the non-real-time controller is configured for:

determining an execution plan comprising one or more tasks to be executed by the one or more distinct modules;

for each of the determined tasks of the execution plan, sending a task parameter command to one of the distinct modules, which has to execute the task, wherein the task parameter command comprises parameters needed to execute the task, and sending an associated task trigger command to the real-time controller, wherein the task trigger command is configured to instruct the real-time controller to trigger the respective module to execute the task with which the task trigger command is associated, wherein each of the task parameter commands and the task trigger commands sent in relation to the tasks of the execution plan is provided with a synchronization identifier; and;

wherein the real-time controller is configured for:

upon receipt of the task trigger commands at the real-time controller, queueing the task trigger commands;

aligning the one or more tasks executed by and/or to be executed by the one or more distinct modules by use of the synchronization identifiers, wherein the step of aligning the one or more tasks comprises, at the real-time controller, after triggering a module to execute a task by executing the associated task trigger command at the real-time controller, checking whether the following task depends on the task currently being executed by means of the synchronization identifiers included in the task parameter commands and the task trigger commands; and executing the queued task trigger commands to trigger the respective modules to execute the task as indicated in the associated task parameter command.

21. System according to claim 20, wherein the real-time controller is selected from a group comprising a Programmable Logic Controller (PLC) and a Remote Telemetry Unit (RTU).

22. System according to claim 20, wherein the non-real-time controller is operatively connected to each of the one or more distinct modules and the real-time controller via a non-real-time connection, such as an Ethernet connection, and wherein the real-time controller is operatively connected to each of the one or more distinct modules via a real-time connection, such as EtherCAt and/or hardware I/O lines.

* * * * *